United States Patent [19]

Givens

[11] Patent Number: 5,429,646
[45] Date of Patent: Jul. 4, 1995

[54] METHOD OF KILLING PHOTOBIOTIC PLANTS

[76] Inventor: Wyatt W. Givens, 2731 Timbercrest La., Highland, Tex. 75067

[21] Appl. No.: 174,985

[22] Filed: Dec. 29, 1993

[51] Int. Cl.⁶ .................. A01G 7/00; A01B 79/00; A01C 1/00
[52] U.S. Cl. ............................ 47/58; 47/9; 47/DIG. 6
[58] Field of Search ............... 47/9, 58, 58.21, 58.22, 47/58.27, DIG. 6, 20

[56] References Cited

PUBLICATIONS

Anderson, 1983, Weed Science: Principles, second edition, p. 71–73, West Publishing Co.
Huxley et al., eds 1992, The New Royal Horticultural Society Dictionary of Gardening, pp. 266–267, The MacMillan Press Limited.
Yepson, ed. 1984, The Encyclopedia of Natural Insect & Disease Control, p. 230, Rodale Press.
Hawksworth, 1983, *In* The Biology of Mistletoes, Calder et al., eds. Academic Press.

*Primary Examiner*—David T. Fox
*Assistant Examiner*—Erich E. Veitenheimer
*Attorney, Agent, or Firm*—Arthur F. Zobal

[57] ABSTRACT

A method for killing the parasite plant mistletoe and other photobiotic plants is disclosed. Opaque, heat-absorbing material is provided. The opaque, heat absorbing material is located about a parasitic plant and secured thereabout. The material is left about the plant until the plant dies from lack of light and from elevated temperatures. The material and the dead parasitic plant are then removed from the host plant.

10 Claims, 2 Drawing Sheets

METHOD OF KILLING PHOTOBIOTIC PLANTS

BACKGROUND OF THE INVENTION

1. Field of the Invention

The invention relates to a process of killing parasitic and other photobiotic plants.

2. Description of the Prior

Mistletoe is a parasitic plant that survives by draining nutrients from host trees. Mistletoe has roots which imbed in the nutrient bearing layers of a host tree and which literally sap the lifeblood from the tree. A moderate infestation of mistletoe upon a tree causes distorted and weakened growth of the tree and a severe infestation can cause the tree to lose limbs and may eventually kill the tree. Annual wood losses in the United States alone due to the Arceuthobium species of the mistletoe family are estimated at 500 million cubic feet.

One process of controlling mistletoe is the removal of young mistletoe plants from the host tree before the young mistletoe roots become too deeply embedded into the tree's limbs. The entire root system of the mistletoe must be removed since even small root fragments will produce new growth. Mistletoe having deep root growth is commonly removed only by the drastic measure of removing the limb of the tree to which the mistletoe is attached. Defoliant chemicals generally are not used for destroying mistletoe because the chemicals can be taken into the host tree and can kill the tree.

SUMMARY OF THE INVENTION it is an object of the invention to provide an environmentally safe, highly efficient method of killing plants particularly parasite plants on trees.

The plant is covered until it dies from lack of light. Preferably a wrap material is provided and is wrapped about the plant so that the wrap material surrounds the plant. The wrap material is left about the plant for a period of time until the plant dies from lack of light. The wrap material and the dead parasite plant then are removed.

In the preferred embodiment, a heat absorbing, opaque, non-porous material is provided and is wrapped about the plant so that the material surrounds the plant. The material is left about the plant for a period of time until the plant dies from excessive heat. The material and the dead plant are then removed from the host plant.

DESCRIPTION OF THE PREFERRED EMBODIMENTS

Figure 1:
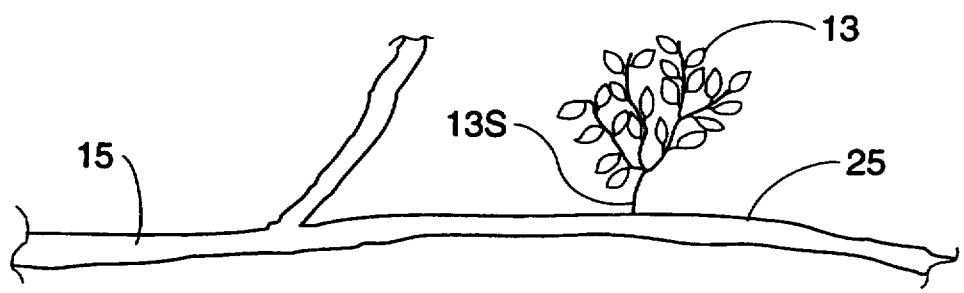
FIG. 1 shows a mistletoe plant attached to a tree limb of a host tree.
Figure 2:
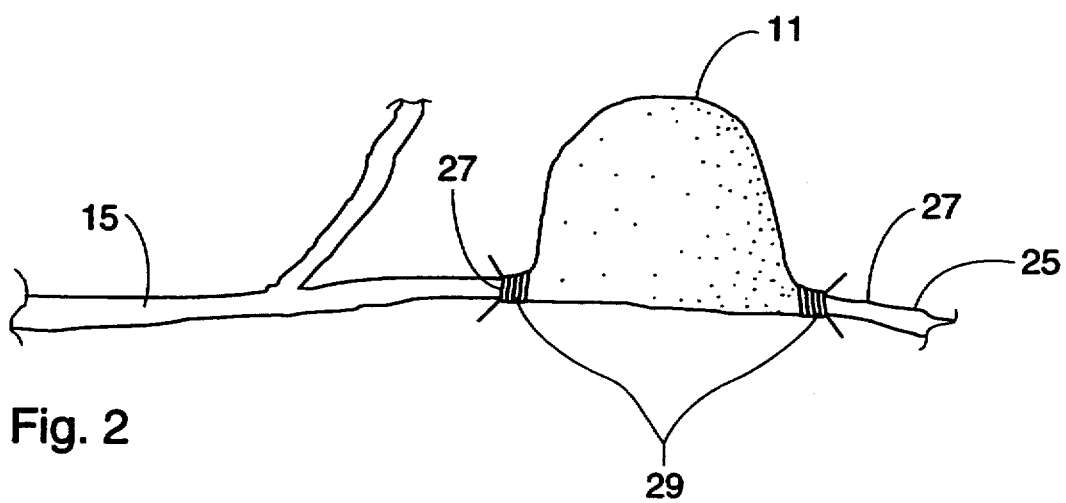
FIG. 2 shows a mistletoe plant wrapped in a sheet of material which also wraps about a tree limb to which the mistletoe is attached.
Figure 3:
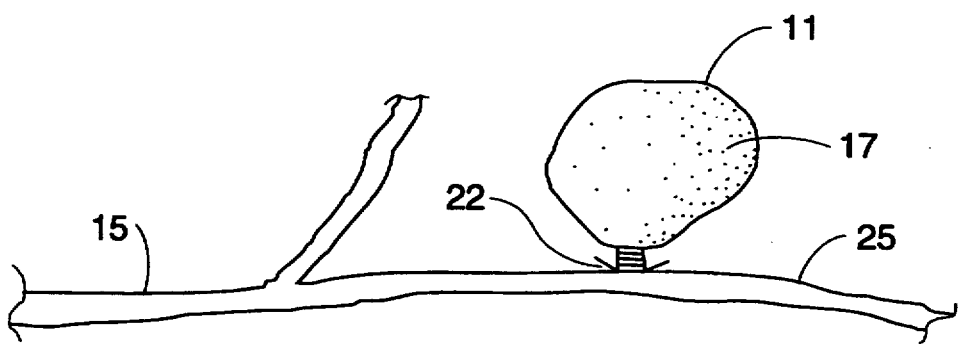
FIG. 3 shows a mistletoe plant enclosed in a bonnet of material.
Figure 7:
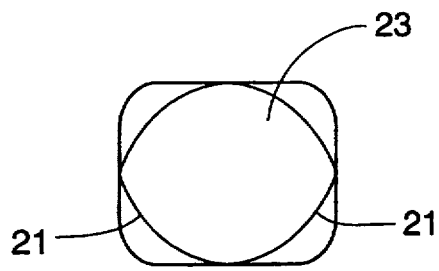
FIG. 7 is an open end view of the bonnet of FIGS. 5 and 6.
Figure 5:
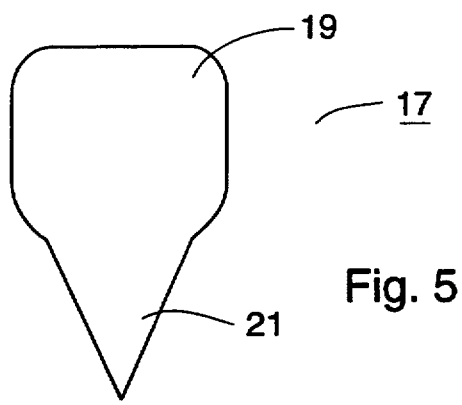
FIG. 5 is a side view of the bonnet of FIG. 4.
Figure 6:
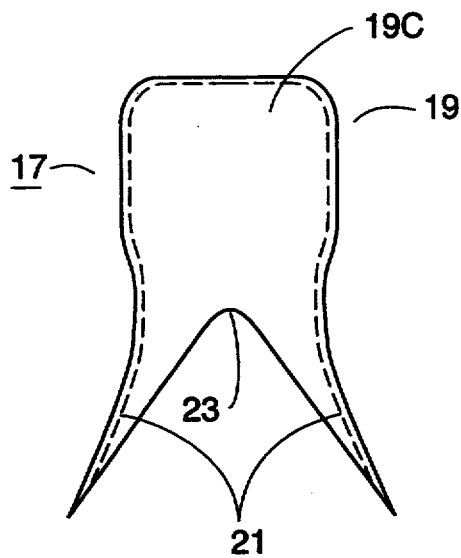
FIG. 6 is a side view of the bonnet of FIG. 4 as seen 90° relative to that shown in FIG. 5.

Referring now to FIGS. 1–3, two forms of wrapping a wrapping material 11 about a parasitic mistletoe plant 13 are shown. The wrapping material 11 is located about the mistletoe 13 for the purpose of killing the parasitic mistletoe 13 in an environmentally safe manner without harming the host tree 15 to which the mistletoe has attached. The wrapping material 11 preferably is formed of a opaque, heat-absorbing, non-porous plastic material which, when wrapped about the mistletoe plant 13, blocks light from reaching the mistletoe and raises the ambient temperature about the mistletoe 13. The wrapping material 11 is located about the mistletoe 13 so as to completely surround the mistletoe plant 13. The wrapping material 11 is left wrapped about the mistletoe plant 13 for a period of time causing the photobiotic mistletoe plant to die from lack of light and from exposure to elevated temperatures. After the mistletoe plant 13 has died, the wrapping material 11 and the dead mistletoe 13 are removed from the tree 15.

In one embodiment, as shown in FIGS. 4–7, the wrapping material 11 may be secured about the mistletoe plant 13 using a bonnet 17 formed of the material 11. The bonnet 17 has a hood portion 19 from which tie portions 21 depend. The hood portion 19 has a cavity 19C disposed therein which is capable of receiving the parasitic mistletoe plant 13. A plant receiving opening 23 located between the tie portions 21 communicates with the cavity so that the plant 13 may be inserted into the hood portion 19 through the opening 23.

The bonnet 17 is located about the mistletoe 13 by positioning the bonnet 17 so that the plant 13 is located in the plant receiving opening 23. The bonnet 17 is guided over the mistletoe plant 13 by gently pulling the hood portion 19 over the mistletoe plant 13, thereby locating the mistletoe 13 in the cavity. Care must be exercised not to tear the wrap material of the bonnet 17 while positioning the bonnet 17 about the mistletoe 13 so that the light blocking and insulative properties of the material will not be compromised.

Figure 4:
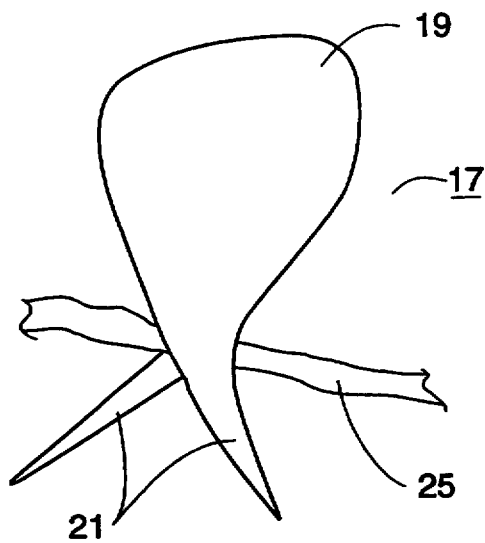
FIG. 4 is a perspective view of a bonnet of a material located about a mistletoe plant on a tree limb with the tie portions of the bonnet extending below the tree limb.
Figure 8:
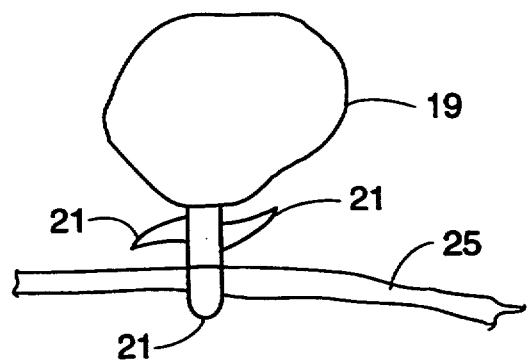
FIG. 8 illustrates the bonnet of FIGS. 4–7 wrapped about the mistletoe and tied to the limb of a tree.

After the mistletoe 13 is located within the hood portion 19 the tie portions 21 are tied together to secure the material of the bonnet about the mistletoe 13. The ties 21 may be tied around the stem 13S as shown in FIG. 3 with extra ties 22 employed if needed. Preferably the ties 21 are tied around the limb 25 covering the stem 13S as shown in FIGS. 4–8. As shown in FIGS. 4 and 8 the tie portions 21 extend past the limb 25 of the host tree 15 on opposite sides of the limb 25 when the hood portion 19 is located over the mistletoe 13. The tie portions 21 are tied together about the limb 25, thereby securing the wrap material 11 to the host tree 15 about the mistletoe 13. Preferably a tie of portions 21 is made below the limb and an additional tie is made around the stem of the plant above the limb by bringing portions 21 above the limb on the same side of the stem, wrapping portions 21 around the stem in opposite directions, each portion a full turn and making a second tie of portions 21. The tie portions 21 and the bonnet 17 do not cover an extensive portion of the limb 25 of the host tree 15 so that the host tree 15 is relatively unaffected by location of the bonnet about the mistletoe 13 and the limb 25.

In the embodiment of FIG. 2 the wrapping material 11 may be secured about the mistletoe plant 13 by wrapping a rectangular sheet of material 11 about the mistletoe 13 and the limb 25 of the host tree 15. A sheet of wrapping material 11 wider than the spread of the mistletoe plant 13 is located so that the mistletoe is centered under the sheet 11. The sheet is then wrapped several times over the mistletoe plant 13 and the host tree limb 25 to which the mistletoe 13 is attached. The edges 27 of the sheet 11 are then gathered and forced towards the base of the mistletoe plant 13 so that as little of the limb 25 of the host tree 15 as possible is wrapped by the sheet 11. The edges 27 are then tied to the limb 25 of the tree 15 with ties 29 such as twine or tape in order to secure the wrapping material 11 about the mistletoe 13.

In a preferred embodiment the material used to encase the mistletoe is opaque, heat-absorbing and non-porous so that the mistletoe 13 is maintained in a dark, moist, heat-elevated environment. Black plastic such as that used to form trash bags is an effective and inexpensive wrap material. Black plastic is opaque to light and therefore prevents light from reaching the mistletoe plant. Without light, the mistletoe plant 13 cannot convert the nutrients taken from the host tree 15 to the compounds needed by the mistletoe to live, therefore, the mistletoe 13 dies. The dark color of the plastic also serves to absorb radiant energy from sunlight, thereby elevating the ambient temperature about the mistletoe plant 13 with the plastic. Plant death is expedited by using a material to stop the light that will also absorb heat from the sun to produce not only a light free but also an elevated temperature environment about the plant 13. Furthermore, the plastic material 11 is non-porous. At the elevated temperatures within the plastic wrapping material 11 evaporation of water is increased, and, in the non-porous plastic encasement about the mistletoe 13, the humidity increases forming a sauna or steam bath environment about the plant which speeds the deterioration of the plant 13. Preferably 2-3 mil thick black plastic is used for the material.

The wrapping material 11 need not be heat absorbing or non-porous. An opaque material which would prevent light from reaching the encased mistletoe plant 13 is sufficient to eradicate the mistletoe. For example, if the weather is excessively hot, or is hot for a prolonged period of time, it might be desirable to use a reflective plastic as a wrapping material in order to exclude light from the mistletoe and minimize the heat in order to prevent local heat damage to the limb of the host tree. A dark porous non-plastic cloth may also be used to block light from reaching the mistletoe while minimizing heat within the wrap 11 or 19.

The wrap material also need not be opaque. A heat absorbing and retaining wrap can effectively kill a plant by elevating the ambient temperature around the plant to a level at which the plant cannot live. Clear, non-porous plastic may be used as a wrap material for killing plants in this manner.

A study was done on the effectiveness of the method of killing mistletoe of the current invention. In the study, two mistletoe plants in North Texas were individually wrapped in sheets of black plastic using the sheet wrap method disclosed above (not a "bonnet" wrap). The first mistletoe plant was about six inches tall and six inches across, and the second mistletoe plant was about twelve inches tall and twelve inches across. The plants were left wrapped for six months, from February to July, and then the wrapping material was removed.

Before removal of the wrapping material it was noted that there was green, healthy foliage on the limbs of the host tree on each side of the plastic encasements. Upon removal of the wrapping material from the first plant only a few traces of dead leaves of the plant were found. There was evidence of where the plant had been attached to the limb of the host tree but no evidence of any remnants of the plant attached. There was no evidence of any local damage to the tree limb. Upon removal of the wrapping material from the second, larger plant more dead plant material was found. The trunk and limbs of the mistletoe plant were dry and hard. The dead leaves were black, dry, and most were covered with mold. Again, little damage was noted to the tree limb of the host tree.

The foregoing disclosure and the showings made in the drawings are merely illustrative of the principles of this invention. For example, the period of time the wrapping material is to be left about the plant is dependent upon the length of time required to kill the plant, which may be significantly shorter than the six months used in the test. Furthermore, other materials may be used to prevent a parasitic plant from receiving light, such as aluminium foil, rubberized or otherwise sealed cloth. Mistletoe is just one type of parasitic plant that may be eradicated by use of the disclosed method. The method is effective for destroying any photobiotic plants whether a parasitic plant on a tree or a plant growing in the ground.

I claim:

1. A method of killing photobiotic parasitic mistletoe plants growing on a limb of a host plant without killing the limb comprising the steps of:

providing a plastic wrap material opaque to light;

covering a photobiotic parasite mistletoe plant that is growing on the limb of a host plant with said wrap material so that said wrap material surrounds said parasite mistletoe plant while surrounding as little of said limb as possible;

waiting a period of time for said photobiotic parasite mistletoe plant to die without killing said limb; and removing said wrap material from said limb of said host plant.

2. The method of claim 1, wherein:

the steps of providing said wrap material comprises providing a non-porous wrap material which kills the photobiotic parasite mistletoe plant about which said material is wrapped by maintaining an excessive ambient temperature about said parasite mistletoe plant.

3. The method of claim 1, wherein:

the steps of providing said wrap material comprises providing a heat absorbing, non-porous wrap material which kills the photobiotic parasite mistletoe plant about which said material is wrapped by maintaining an excessive ambient temperature about said parasite mistletoe plant as well as by preventing light from reaching said parasite mistletoe plant.

4. The method of claim 3, wherein;

said wrap material is formed of black plastic, said wrap material is removed from said parasite plant after a period of time of not more than six months after installation.

5. The method of claim 1, wherein said method comprises the steps of:

wrapping said opaque wrap material about said parasite mistletoe plant and said limb at the location where said parasite mistletoe plant is attached to said limb so that said parasite mistletoe plant is completely covered by said wrap material;

gathering said opaque wrap material on each side of said covered parasite mistletoe plant;

tying said gathered opaque wrap material with a tie material about the limb and as near said covered parasite mistletoe plant as possible to minimize coverage of said limb with said wrap material.

6. The method of claim 5, wherein:

the step of providing a wrap material comprises providing a non-porous wrap material which kills the parasite mistletoe plant about which said material is wrapped by maintaining an excessive ambient temperature about said parasite mistletoe plant.

7. The method of claim 5, wherein:

the step of providing a wrap material comprises providing a heat absorbing, non-porous black plastic wrap material which kills a photobiotic parasite mistletoe plant about which said material is wrapped by maintaining an excessive ambient temperature about said parasite mistletoe plant as well as by preventing light from reaching said parasite mistletoe plant.

8. The method of claim 1, wherein said method comprises the steps of:

tying said wrap material about said parasite mistletoe plant at a location where said parasite mistletoe plant is joined to said limb.

9. The method of claim 8, wherein:

the step of providing a wrap material comprises providing a non-porous wrap material which kills the parasite mistletoe plant about which said material is wrapped by maintaining an excessive ambient temperature about said parasite mistletoe plant.

10. The method of claim 8, wherein:

the step of providing a wrap material comprises providing a heat absorbing, non-porous wrap material which kills a parasite mistletoe plant about which said material is wrapped by maintaining an excessive ambient temperature about said parasite mistletoe plant as well as by preventing light from reaching said parasite mistletoe plant.

* * * * *